United States Patent [19]

Baker

[11] Patent Number: 4,836,584
[45] Date of Patent: Jun. 6, 1989

[54] SERVICEABLE THREADED CONDUIT COUPLING

[75] Inventor: James A. Baker, Williamsville, N.Y.

[73] Assignee: General Motors Corporation, Detroit, Mich.

[21] Appl. No.: 220,284

[22] Filed: Jul. 18, 1988

[51] Int. Cl.4 .................................... F16L 19/03
[52] U.S. Cl. .................................. 285/351; 285/353; 285/354; 285/924
[58] Field of Search ............... 285/353, 354, 351, 924

[56] References Cited

U.S. PATENT DOCUMENTS

| 2,562,294 | 7/1951 | Cahenzli | 285/353 X |
| 3,393,930 | 7/1968 | Ziherl et al. | 285/354 X |
| 3,533,649 | 10/1970 | Williams | 285/354 X |
| 3,847,421 | 11/1974 | Eschbaugh et al. | 285/353 |
| 4,463,974 | 8/1984 | Ergun | 285/354 X |

Primary Examiner—David A. Scherbel
Assistant Examiner—Anthony W. Williams
Attorney, Agent, or Firm—R. L. Phillips

[57] ABSTRACT

A coupling for a fluid conduit under pressure has a plug carrying O-rings and inserted in a socket. A bead on the plug forms a stop for location of the O-rings. A nut rotatably mounted on the plug and held adjacent the bead has an elongated threaded annulus engaging threads on the socket so that nut rotation in either direction causes corresponding axial movement of the plug. Upon disconnection of the coupling the nut is partially backed off to remove the plug causing pressure release while the nut is still attached to the socket.

1 Claim, 1 Drawing Sheet

SERVICEABLE THREADED CONDUIT COUPLING

FIELD OF THE INVENTION

This invention relates to a fluid conduit coupling and particularly to a conduit coupling having a pressure relief feature for fluids under pressure.

BACKGROUND OF THE INVENTION

Conduits are often connected together by couplings with fluid under pressure from a source of pressurized fluid, such as a compressor in an air conditioner system, so that even though the compressor may not be in operation, fluid under pressure may still be in the conduits when it is necessary to disconnect them from the source of pressurized fluid. To effect this disconnection of the conduits the coupling should be constructed so that it can be partly disconnected so as to permit venting of fluid pressure from the conduits before the coupling is completely disconnected.

It is highly desirable that the venting of pressure during disconnection of the coupling be positively performed so that even in the case of sticking seals or other parts the pressure will necessarily be released before complete disconnection. It also is preferred that the operation of the coupling, connecting as well as disconnecting, can be carried out without special tools.

Many coupling designs with two stages of disconnection for pressure relief have been proposed. The U.S. Pat. No. 3,718,350 to Klein, shows a coupling with a plug carrying an O-ring seal insertable into a socket. Annular shoulders in the socket cooperate with a split retaining ring in the plug to hold the coupling in a pressure relief state after the retaining ring has been released from its fully engaged position. Special tools are required to release the retaining ring.

Another Klein patent, U.S. Pat. No. 3,574,359, has a double O-ring seal carried by a plug and inserted into a socket. Two sets of detentes held in place by a threaded sleeve make a two stage disconnection possible but there is no positive release of pressure so that the detentes could all be removed prior to removing the plug from the socket. The U.S. Pat. No. 3,847,421 to Eschbaugh achieves similar results. A plug carrying an O-ring is inserted into a socket and held there by a threaded nut engaging the socket and bearing against a bead on the plug via a sheet metal collar. The nut has sufficient threaded extent to be partially backed off to allow pressure release but there is no mechanism to assure the seal will be broken at that time. The nut may be completely removed while the seal is intact and the pressure still present.

U.S. Pat. No. 3,826,523 to Eschbaugh shows a socket with an interior shoulder, a plug with a bead for holding an O-ring into the socket and a collet with long fingers abutting the shoulder to maintain the assembly and a short finger to engage the shoulder when the long fingers are released upon disassembly, thus holding the plug in a pressure relief state.

U.S. Pat. No. 3,584,902 to Vyse uses a double O-ring seal in a plug and socket coupling and has two spaced retaining clips which must be removed one at a time for disassembly. The second clip can be removed only when the seal has been partly broken for slow pressure release.

Thus many approaches to the pressure relief requirement have been proposed. Some merely provide the opportunity for the operator to release the pressure prior to complete decoupling, there being no positive seal breaking at the second stage of disconnection. Some require elaborate mechanisms with many parts and even clips or small detentes which make reassembly a time consuming operation.

SUMMARY OF THE INVENTION

It is therefore an object of the invention to provide a coupling having a simple structure and achieving a two stage disconnection operation with a positive pressure release.

The invention is carried out by a fluid conduit coupling comprising; a tubular member defining a socket, a tubular plug member slidably received in the socket for movement between a sealing position and a release position, the plug member including seal means for sealingly engaging the socket when in sealing position therein and for releasing the sealing engagement when in release position, an annular member rotatably secured to the plug member and held against axial movement relative to the plug member, the tubular member and the annular member defining cooperative threaded means having axial travel during rotation of the annular member exceeding that required to move the plug member between the sealing position and the release position, whereby the coupling can be uncoupled by rotating the annular member to move the plug member to release position for pressure relief and then further rotating the annular member for complete uncoupling.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 1:
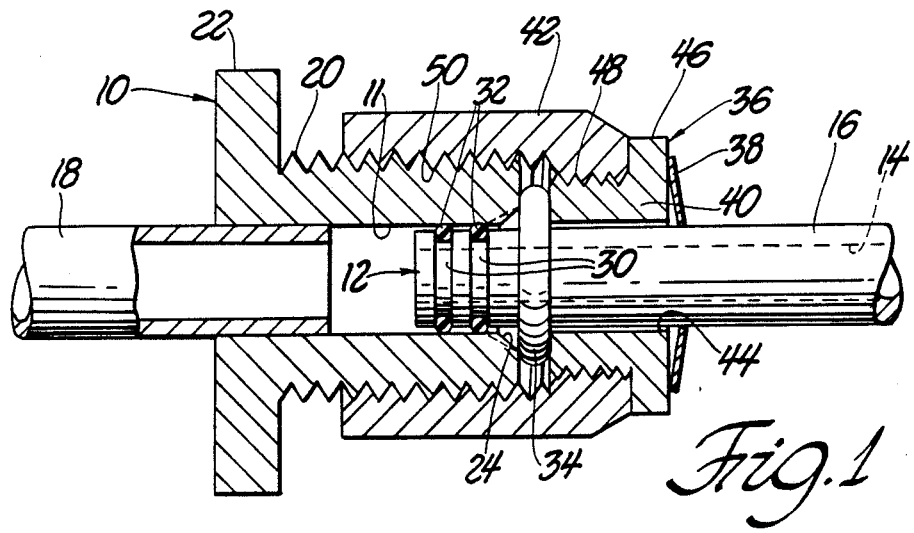
FIG. 1 is a cross sectional view of a conduit coupling in fully coupled state according to the invention.

Referring to the drawings, a conduit coupling for pressurized fluid applications comprise an annular outer female tubular member or socket 10 with a bore 11 and an annular inner male tubular member or plug 12 with an axial bore 14 therethrough. The plug 12 is reciprocably received in the socket to couple two tubular conduits 16 and 18 together. These conduits may be, for example, flexible hoses or metal pipes and the conduits may be separate elements suitably attached to the coupling elements such as separate conduit 18 suitably connected to socket 10 or the conduits may be formed as integral parts of the coupling, as for example, conduit 16 and plug 12 formed as an integral element.

Figure 3:
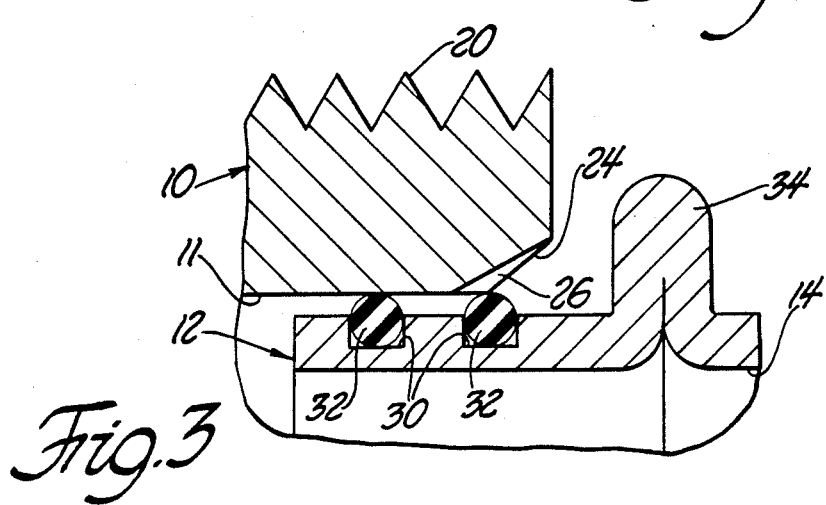
FIG. 3 is an enlarged view of a detail of a pressure bleed vent of the coupling according to the invention.

The socket 10 has external threads 20 and a hex shaped flange 22 at the end nearest the conduit 18. The socket opening has a chamfered mouth 24 for easy insertion of the plug 12. As best shown in FIG. 3, a small vent 26 or notch extends across the break between the chamfer and the socket bore 11 in two opposed locations on the mouth 24.

Figure 2:
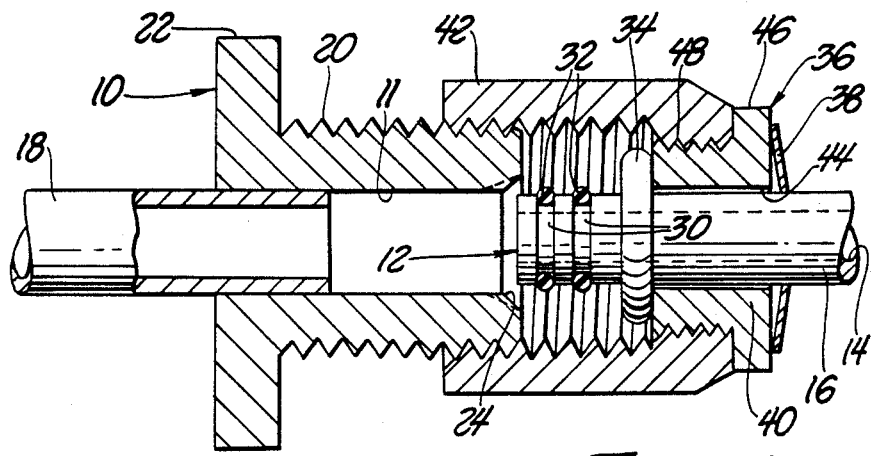
FIG. 2 is a cross sectional view of a conduit coupling in a partially disconnected pressure release state according to the invention.

The plug 12 has a pair of spaced annular grooves 30 near the inner end of the plug, each groove retaining an O-ring 32 which sealingly engages the bore 11 of the socket 10. An annular bead 34 or upset portion on the plug 12 spaced outboard of the grooves 30 serves as a stop member engaging the end of the socket 10 for precisely locating the O-rings in the socket upon assembly. A nut 36 is rotatably mounted on the plug outboard of the bead and adjacent thereto and is secured in position by a permanent retainer 38 such as a push nut. The nut 36 is composed of two parts: a hub 40 and an internally threaded annular portion 42. The hub 40 has a bore 44 for freely turning on the plug and for providing a fluid flow path during pressure release, a hex flange 46 and an external left hand thread 48. The threaded portion 42 has a corresponding left hand thread for engaging the hub 40 and a right hand thread 50 for engaging the threads 20 on the socket. The outer surface is hex form to receive a wrench. The threaded portion 42 is elongated so that it can be securely threaded to the socket not only when the plug is fully inserted in the socket in a sealing position but also when the plug is just free of the socket in release position, as shown in FIG. 2. To assure that the threaded coupling is secure in the release position, the axial travel between the nut and socket due to nut rotation is greater than the plug travel between the sealing position and the release position. To assemble the two halves of the coupling the nut 36 is threaded onto the socket 10 to insert the plug 12 into the socket. As the nut is so rotated it bears against the bead 34 to assert the necessary insertion force. Usually the end of the plug carrying the O-rings is liberally lubricated with oil so that when the O-rings enter the bore 11 of the socket 10 and are compressed, the volume of oil trapped between the O-rings is sometimes so great that, in the absence of an oil bleed, very high pressure could be generated resulting in deformation and damage to the seal nearest the bead 34. To prevent such damage the vent 26 in the mouth 24 of the socket allows excess oil to bleed from the seal area as the rear O-ring enters the bore and is compressed to its final dimension. When the nut 36 is rotated to complete the assembly the plug 12 is fully inserted with the bead 34 abutting the end of the socket 10 as shown in FIG. 1.

To disconnect the coupling the nut 36 is rotated in the proper direction so that it pushes against the retainer 38 to force the plug from the socket. This force is effective for the plug removal even when the plug tends to stick in the socket. When the seal is broken, as shown in FIG. 2, any fluid under pressure can escape through the coupling by passing between the hub 40 of the nut and the plug 12. At that time the nut still securely engages the threads 20 of the socket to assure a controlled pressure release. Such fluid pressure release is automatic, not dependent on any special actions of the operator who might not be aware of the pressure. Still the controller pressure release, when it occurs, will be apparent to the operator so that the release may be permitted to continue to its completion before the nut is removed.

After disconnection of the coupling the parts thereof are all secured to either of the conduits 16 or 18, there being no small clips or other pieces to recover and reassemble. While the coupling is apart the seal portion of the plug is protected by the threaded portion 42 of the nut 36 which projects beyond the end of the plug. When the unit is disassembled it is sometimes desirable to service the seal by replacing the O-rings. To gain service access to the O-rings the threaded portion 42 is temporarily removed from the hub 40 of the nut 36.

It will thus be seen that the coupling according to the invention has a simple structure with few parts which is inexpensive to manufacture, and has a two stage disconnection with a positive pressure release feature.

The embodiments of the invention in which an exclusive property or privilege is claimed are defined as follows:

1. A fluid conduit coupling comprising;

a tubular member defining a socket and having external threads, a tubular plug member slidably received in the socket for movement between a sealing position and a release position, the plug member including seal means for sealingly engaging the socket when in sealing position therein and for releasing the sealing engagement when in release position, a nut secured to the plug member and mounted for rotation in a fixed axial position on the plug member, the nut having a threaded portion engaging the tubular member for moving the plug member upon nut rotation from the sealing position to the release position for pressure release, and for detaching the plug member from the tubular member upon further nut rotation beyond the release position, the seal means comprising a pair of axially spaced O-rings, the socket having a chamfered opening to facilitate insertion of the plug means into the socket means, and pressure vent means at the chamfered opening to prevent pressure build-up between the O-rings during insertion of the O-rings into the socket.

* * * * *